United States Patent [19]
Meinecke et al.

[11] Patent Number: 5,437,784
[45] Date of Patent: Aug. 1, 1995

[54] INJECTOR FOR A FLOTATION DEVICE

[75] Inventors: Albrecht Meinecke; Michael Trefz, both of Heidenheim; Helmut Heinzmann, Böhmenkirch, all of Germany

[73] Assignee: J. M. Voith GmbH, Heidenheim, Germany

[21] Appl. No.: 237,381

[22] Filed: May 3, 1994

[30] Foreign Application Priority Data
   May 3, 1993 [DE] Germany .................. 43 14 507.8

[51] Int. Cl.$^6$ ............................ B03D 1/24; B01F 3/04
[52] U.S. Cl. ........................ 209/170; 210/221.2; 261/36.1; 261/76; 261/DIG. 75; 366/336; 366/338; 366/340
[58] Field of Search ............. 209/170; 210/221.2, 210/221.1; 261/36.1, 76, DIG. 75; 366/336, 338, 340

[56] References Cited
U.S. PATENT DOCUMENTS 3,785,620  1/1974  Huber .
3,871,624  3/1975  Huber et al. .
4,548,673 10/1985  Nanda .
4,620,926 11/1986  Linck et al. .
4,726,897  2/1988  Schweiss et al. .
4,861,165  8/1989  Fredriksson .
4,952,308  8/1990  Chamberlain .
4,964,733 10/1990  Fredriksson .

FOREIGN PATENT DOCUMENTS
3741843A1  6/1989  Germany .

Primary Examiner—Thomas M. Lithgow
Attorney, Agent, or Firm—Marshall, O'Toole, Gerstein, Murray & Borun

[57] ABSTRACT

A flotation device includes an injector having a flow channel with a variable cross sectional area with respect to the direction of fluid flow through the injector. The injector introduces a mixture of gas and liquid into the device. The injector flow channel has repeated narrowings and widenings in the direction of fluid flow through the injector.

9 Claims, 5 Drawing Sheets

Fig. 1a
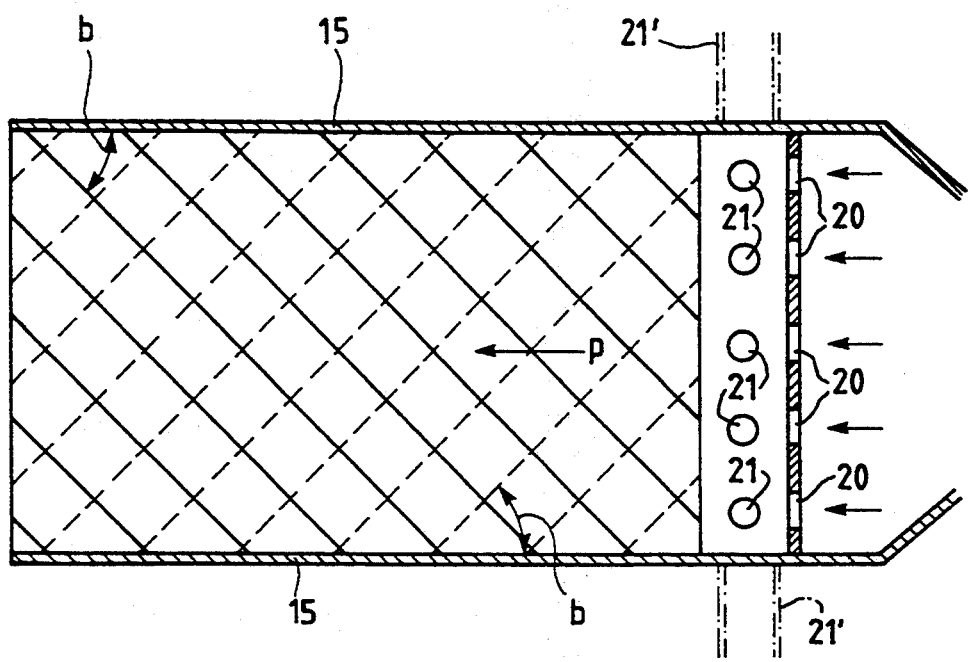
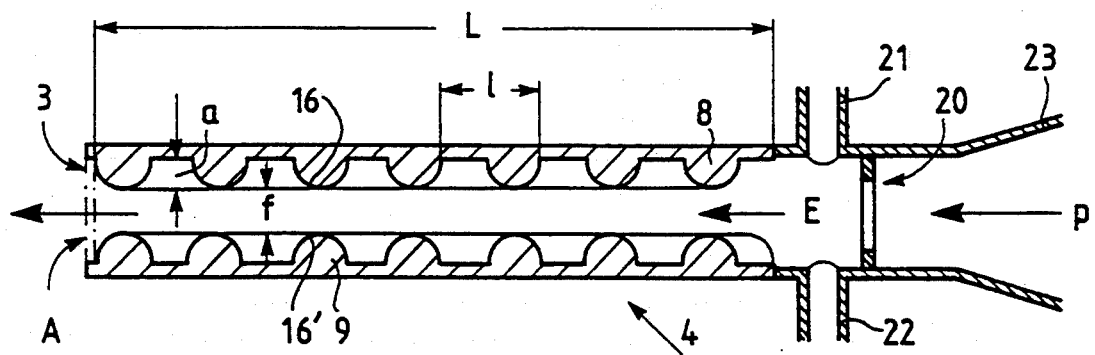
Fig. 1

INJECTOR FOR A FLOTATION DEVICE

BACKGROUND OF THE INVENTION

1. Field of the Invention

The invention relates to flotation devices and in particular to an injector for mixing air and another fluid, such as a fiber suspension, in a flotation device.

2. Description of Related Technology

An injector having a variable cross section for use in a flotation device is known from DE 34 01 161 (corresponding to Linck et al., U.S. Pat. No. 4,620,926 issued Nov. 4, 1986). Considerable turbulence is produced by step-wise changes in the cross-sectional area of the device. As a result, relatively fine air bubbles are mixed with a liquid suspension flowing therethrough. Air is introduced from a side of the device upstream of the step-wise changes.

On the other hand, mixing devices are known for various liquid components in which plates with irregular, substantially ridge-shaped surfaces, inclined at a certain angle to the direction of flow, are disposed so that the ridges of neighboring plates crisscross. A mixing device disclosed in DE 22 05 371 (corresponding to Huber, U.S. Pat. No. 3,785,620 issued Jan. 15, 1974 and Huber et al., U.S. Pat. No. 3,871,624 issued Mar. 18, 1975) is provided with spherical caps of the ridges of neighboring plates which touch one another. A plurality of parallel plates are provided in a housing perpendicular to the direction of flow. The housing has a circular cross section. To improve the mixing action, the plates are preferably disposed in packets in the housing so that plates or neighboring packets of plates butting against one another always have opposite angles of inclination with respect to the longitudinal axis (flow direction) of the mixer housing.

Furthermore, there are flotation devices such as those disclosed in DE 36 14 933 (corresponding to Schweiss et al., U.S. Pat. No. 4,726,897 issued Feb. 23, 1988) for the treatment of waste paper suspensions in which only a few injectors are used for aerating the suspension. Preferably, these injectors are oriented vertically so that they are immersed into the suspension from the top thereof. However, there are also devices in which the injectors are disposed horizontally, that is, they provide horizontal inflow of a suspension.

DE 37 41 843 discloses a device for mixing liquids with gases having an annular flow channel with projections extending into it. The device uses annular channels only and is unsuitable for large flotation installations with high throughputs for aerating pulp suspensions.

SUMMARY OF THE INVENTION

It is an object of the invention to overcome one or more of the problems described above. It is also an object of the invention to provide an injector suitable for very large flotation installations with very high throughputs, permitting satisfactory aeration of a fiber suspension utilizing many small air bubbles.

A flotation device according to the invention includes an injector having a flow channel with a variable cross sectional area with respect to the direction of fluid flow through the injector. The injector introduces a mixture of gas and liquid into the device. The injector has a flow channel with repeated narrowings and widenings in the direction of fluid flow through the injector.

Other objects and advantages of the invention will be apparent to those skilled in the art from the following detailed description taken in conjunction with the drawing and the appended claims.

BRIEF DESCRIPTION OF THE DRAWINGS

FIG. 1 is an axial cross-sectional view of an injector according to the invention.

FIG. 1a is a partial top plan view of the injector shown in FIG. 1.

DETAILED DESCRIPTION OF THE INVENTION

Figure 2A:
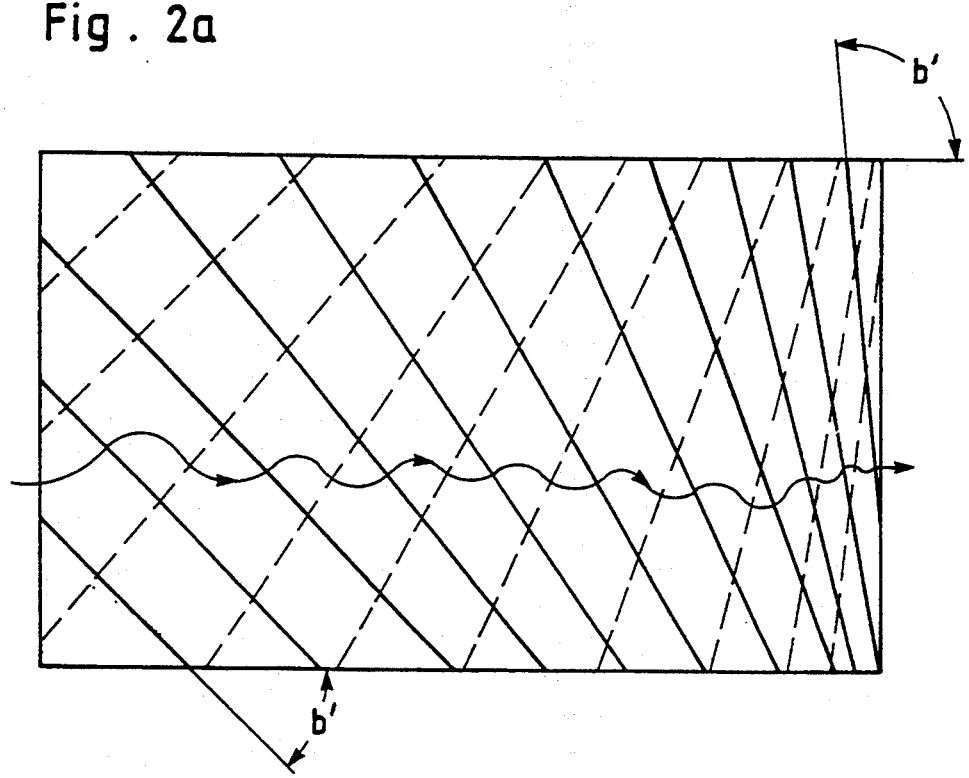
FIG. 2a is a partial top plan view of the injector shown in FIG. 2.

A flotation device according to the invention includes an injector having injector plates defining a flow channel with repeated narrowings and widenings in the direction of fluid flow through the injector. The narrowings and widenings are provided by projections disposed on the injector plates. Good mixing with air bubbles in an inventive injector is achieved by the strong turbulence of the flow, caused by the projections on the opposite plates of the injector. The projections are advantageously in the form of ridges. The path of the ridges of one injector plate preferably crosses the path of the ridges of a neighboring plate (i.e. the ridges of an injector plate are disposed at an angle with respect to the ridges of a neighboring plate). Such an orientation is similar to the state of the art described above. However, according to the invention, only a few, and preferably only two opposite plates, or two concentrically arranged components in the form of a tube or cylinder, are provided with projections. There is a considerable distance between the ridges or caps of the two plates or bodies. In an embodiment of an injector according to the invention which includes tubes or cylinders as opposed to plates, it is advantageous to arrange the projections in the form of a continuous spiral.

A device according to the invention shown in FIG. 1 includes an injector having oppositely positioned injector plates 3 and 4 having projections 8 and 9, respectively. The plates 3 and 4 have a length L defined by an inlet end E and an outlet end A. Each projection 8 or 9 is separated by a distance l. With reference to FIGS. 1 and 1a, the projections 8 and 9 preferably have generally spherical caps or ridges which are oriented at an angle b with respect to a side wall 15 of the injector.

The side wall 15 is parallel to the direction of fluid flow through the injector. The ridges are oriented at an angle of between about 10° and about 90° (preferably between about 10° and about 80°) with respect to the direction of fluid flow through the injector. The angle b preferably increases between about 30° and about 90° from the inlet end E to the outlet end A. The increase may occur incrementally from projection to projection or between related groups of consecutive projections.

As shown in FIG. 1, the injector has inlet channels 21 and 22 for injecting air into the device. The channels 21 and 22 are connected to an inlet channel 23 disposed upstream of an aperture 20 with respect to the direction of fluid flow through the device shown by an arrow p. Alternatively, one or two side inlet channels 21' shown in phantom in FIG. 1a may be provided for introducing compressed air into the device.

The projections 8 and 9 each have a height a. The distance f between planes that contact the spherical caps 16 of the projections 8 and the spherical caps 16' of the projections 9 is in a certain ratio to the height a of the projections. This ratio falls within the following range:

$$0.1 \leq f/a \leq 10, \text{ and preferably } 1 \leq f/a \leq 10.$$

Figure 2:
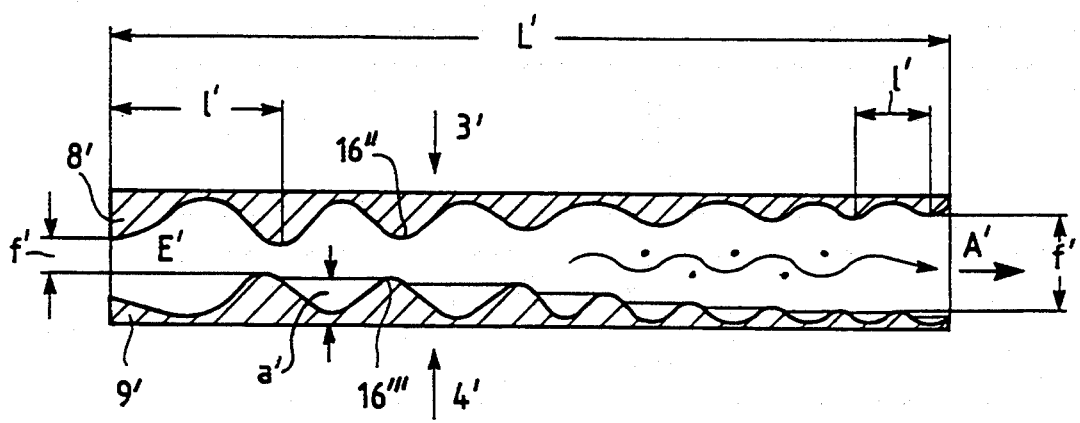
FIG. 2 is an axial cross-sectional view of a second embodiment of an injector according to the invention.

FIG. 2 shows a device according to the invention having two similar, oppositely oriented injector plates 3' and 4' with projections 8' and 9' respectively. The projections 8' and 9' decrease in size from an inlet end E' to an outlet end A' of the injector. The distance f' between planes that touch spherical caps 16'' of the projections 8' and the spherical caps 16''' of the projections 9' increases in length from the inlet end E' to the outlet end A'. Likewise, a corresponding wavelength l' of the projections decreases from the inlet end E' to the outlet end A'. In comparison, the embodiment of the injector according to the invention shown in FIG. 1 has a distance l between projections which remains constant.

With respect to the embodiments shown in FIGS. 1 and 1a and 2 and 2a, the value of the ratio of the total length L or L' of the injector plates to the mutual distance l or l' of the spherical caps of the projections can range, for example, as follows:

$$5 \leq L/l \leq 100 \text{ and}$$

$$5 \leq L'/l' \leq 100.$$

The ratio of the mutual distance l or l' of spherical caps of the projections to the height a or a', respectively, of the projections can range, for example, as follows:

$$1 \leq l/a \leq 10 \text{ and}$$

$$1 \leq l'/a' \leq 10.$$

With respect to FIGS. 2 and 2a, because a wave is formed by the projections 3' and 4', the length l' may also be defined as a wavelength λ. With respect to FIGS. 1 and 2, the maximum height of the projections 8, 8', 9, and 9' ranges between about 4 mm and about 20 mm.

Figure 3:
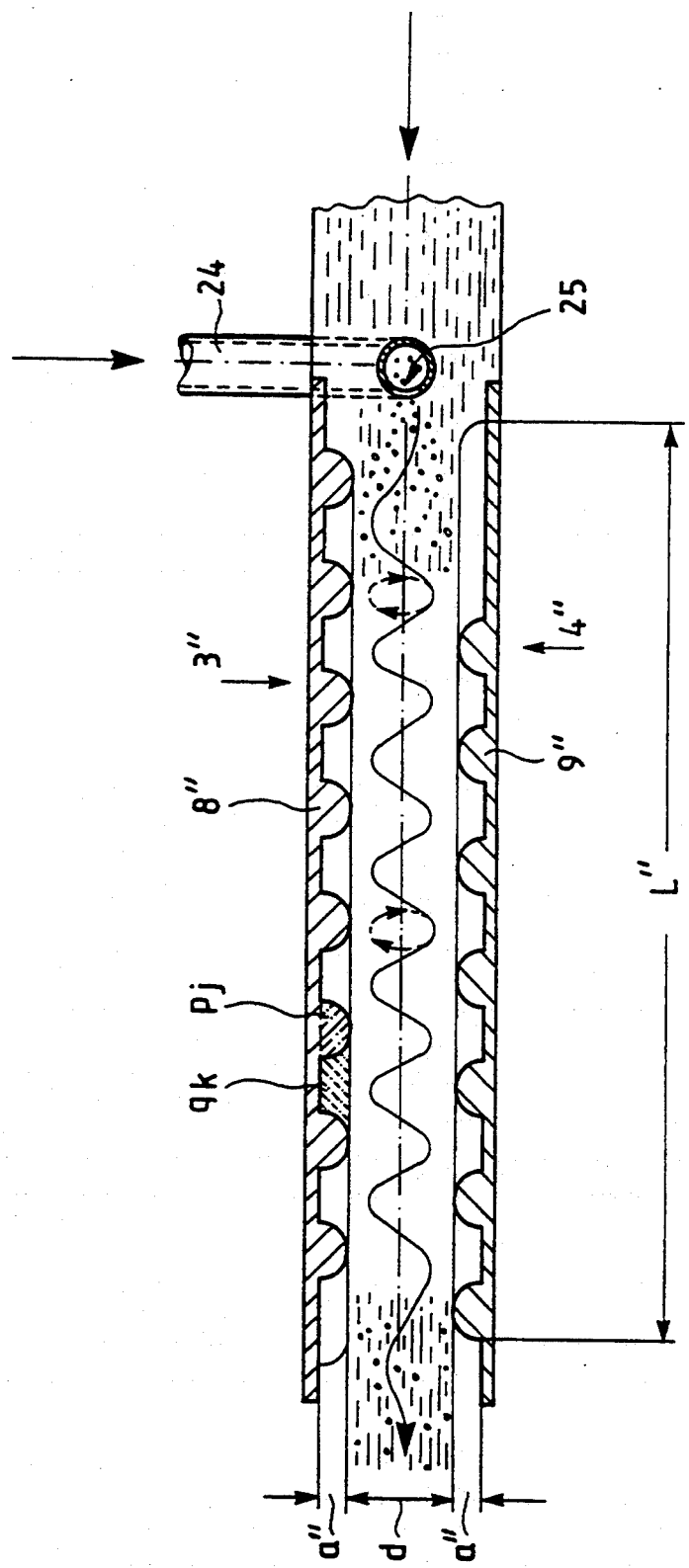
FIG. 3 is an axial cross-sectional view of a third embodiment of an injector according to the invention.

FIG. 3 shows an embodiment of an injector according to the invention which is similar to the embodiment shown in FIG. 1. The injector includes injector plates 3'' and 4'' having projections 8'' and 9'', respectively. The plates 3'' and 4'' have a length L''. However, air is introduced into the injector of FIG. 3 differently than in the embodiment shown in FIG. 1. An inlet tube 24 with outlet openings 25 introduces air into the injector from a side thereof.

Figure 4A:
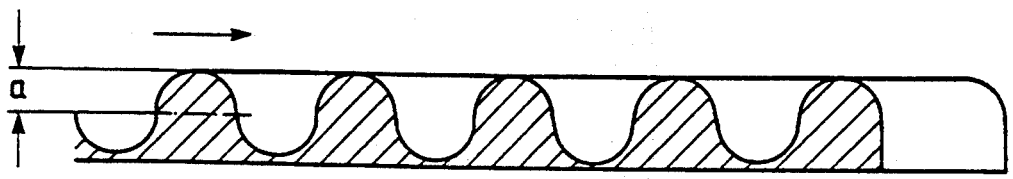
FIG. 4a is a cross-sectional view of an injector plate for use in an injector according to the invention.
Figure 4B:
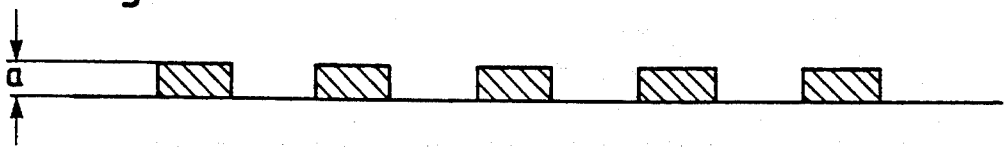
FIG. 4b is a cross-sectional view of a second embodiment of an injector plate for use in an injector according to the invention.
Figure 4C:
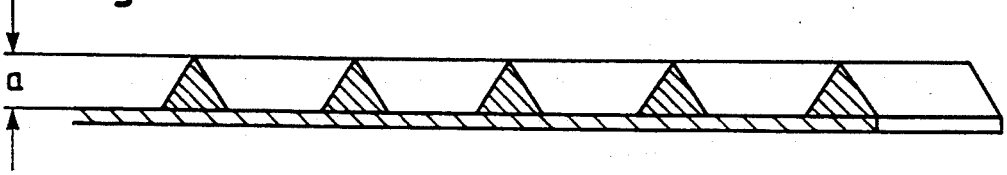
FIG. 4c is a cross-sectional view of a third embodiment of an injector plate for use in an injector according to the invention.
Figure 4D:
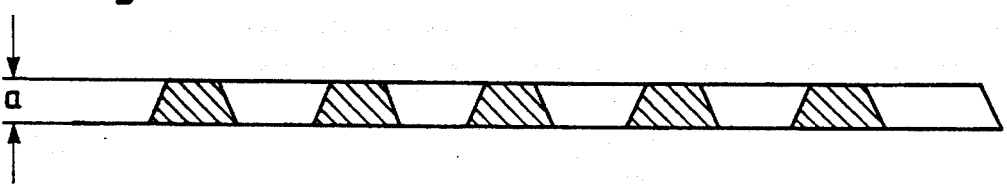
FIG. 4d is a cross-sectional view of a fourth embodiment of an injector plate for use in an injector according to the invention.
Figure 4E:
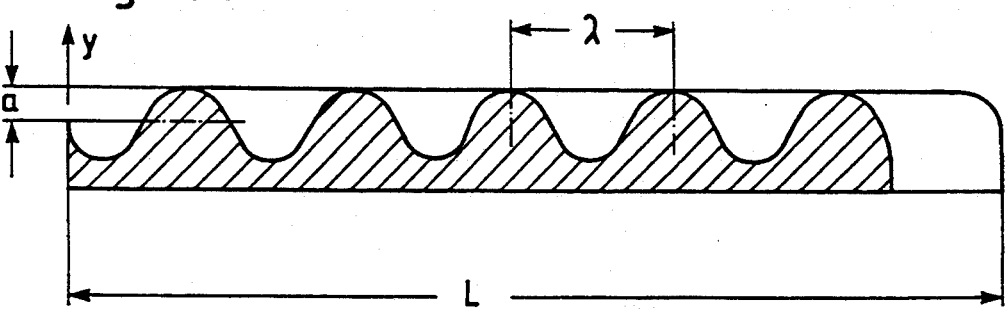
FIG. 4e is a cross-sectional view of a fifth embodiment of an injector plate for use in an injector according to the invention.

FIGS. 4a to 4e illustrate other possible embodiments of projections for injectors according to the invention. In particular, FIG. 4a illustrates projections having a circular profile, FIG. 4b a rectangular profile, FIG. 4c a triangular profile, and in FIG. 4d a trapezoidal profile. The profile in FIG. 4e is a sinusoidal profile, where the wavelength λ is constant. This profile form can be described by the formula:

$$y = a \cdot \sin(2\pi/\lambda \cdot x).$$

Figure 5:
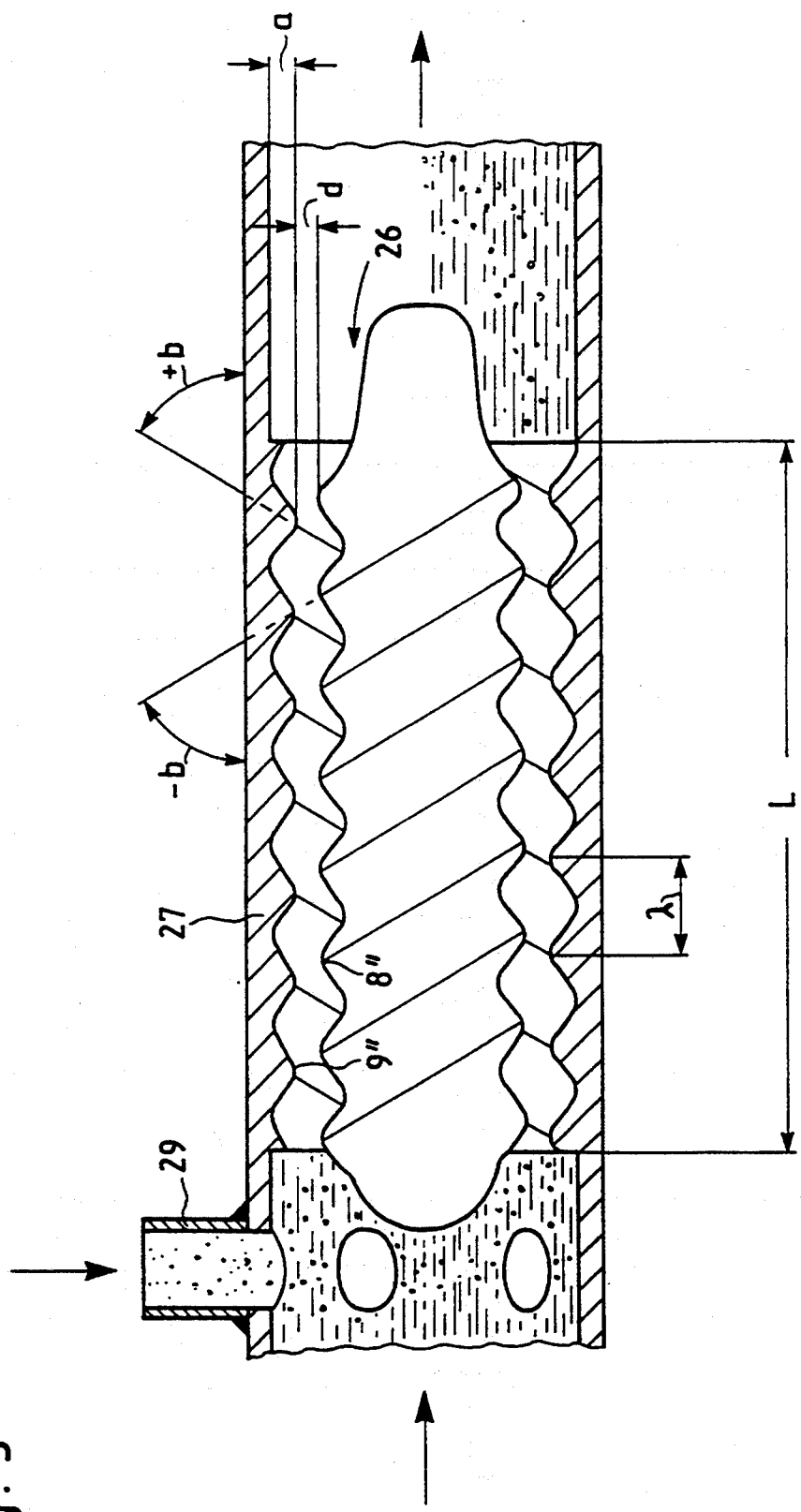
FIG. 5 is an axial cross-sectional view of a fourth embodiment of an injector according to the invention.

FIG. 5 shows an embodiment of an injector according to the invention having a substantially cylindrical inner part, generally designated 26 and an outer part 27 (i.e., a hollow cylinder). The outer part 27 includes projections 8'' and 9'' and has air inlet tubes 29.

The injectors according to the invention produce air bubbles having an average diameter of about 1 mm. With an injector according to the invention finer air bubbles are produced in larger amounts than with the large prior art injectors so that de-inking of a fiber suspension may be completed faster. The injectors of the art have dimensions which are adapted to very large flotation installations. The injectors according to the invention produce a highly turbulent fluctuating velocity with a relatively short mixing path. The flow velocities in the injectors according to the invention range from about 5 m/sec to about 15 m/sec.

To be cost effective, the number of plates and thus the number of flow channels formed within an injector of the invention should be relatively low. Thus, preferably, at most four plates forming three parallel channels therebetween is sufficient. In this regard, a particularly preferred embodiment according to the invention includes two plates forming one flow channel therebetween.

As described herein, various forms of projections may be utilized in an injector according to the invention. The projections may be parallel to one another or may deviate up to about 8° with respect to one another. Furthermore, the cross-sectional areas of the projections with respect to a longitudinal axis of the flow channel or injector plates, that is, the distance between the inlet and the outlet of the channels is important. With reference to FIG. 3, the cross-sectional area of a projection 8'' is designated $p_j$ and the cross-sectional area of an intermediate space between neighboring projections 8'' is designated $q_k$. The ratio $p_j/q_k$ must be at least about 0.5:1. With respect to an entire injector plate, this 0.5:1 ratio also applies to the ratio of the sum of the cross sections of all of the projections to the sum of the cross-sectional areas of all the intermediate spaces. Preferably, the sum of all the cross-sectional areas of the projections of a plate with respect to the entire length L of a plate or flow channel (that is, per plate side) is greater than 4000 mm$^2$/m. The minimum distance between two neighboring projections of neighboring plates is at least about 5 mm and preferably about 8 mm.

In an injector according to the invention, the flow velocity based on an inside cross-sectional area of a particular channel (the width of which is the distance d between two planes tangent to neighboring projections as shown in FIG. 3) must be greater than 3 m/sec. Preferably the flow velocity ranges between about 6 m/sec and about 10 m/sec. The plate distance d also serves to keep the pressure loss relatively low, which, if possible, should not exceed 1 bar.

The plate distance d has a strong influence on the spectrum of sizes of the air bubbles formed in the injector. When an injector according to the invention is utilized for de-inking paper pulp, different distances d are necessary to obtain optimum de-inking depending on the type of pulp and the size of ink particles. If the ink particles have a broad size spectrum, it is advantageous to produce corresponding air bubbles of corresponding sizes in several consecutive mixing channels with different distances d. It is advantageous to first produce large air bubbles and subsequently produce numerous smaller air bubbles. On the other hand, this means that the distance d between the projections of the plates of a plate pair or plate group to the following plate group becomes smaller and smaller. Preferred values for the distance d range between about 10 mm and about 50 mm. Also with respect to FIG. 3, preferred values for the distance a" (the projection height) range between about 4 mm and about 20 mm.

The foregoing detailed description is given for clearness of understanding only, and no unnecessary limitations should be understood therefrom, as modifications within the scope of the invention will be apparent to those skilled in the art.

We claim:

1. In a flotation apparatus comprising a flotation device for separating constituents by flotation and comprising an injector having a flow channel with an inlet end and an outlet end, means for introducing a liquid into said flow channel, and means for introducing a gas into said flow channel, both said liquid introducing means and said gas introducing means disposed upstream of said flow channel with respect to a direction of fluid flow through the channel, said flow channel having a variable cross sectional area with respect to the direction of fluid flow through the injector, said injector connected to means for introducing a mixture of gas and liquid from said injector into the flotation device, the improvement comprising repeated narrowings and widenings of the flow channel in the direction of fluid flow and wherein the flow channel is defined by first and second opposing injector plates, said flow channel being substantially narrow, each said plate having elongate projections defining a plurality of ridges, with adjacent ridges oriented with respect to one another ranging from being parallel to deviating at most 8° with respect to one another, the elongate projections of the first plate crossing in superposed relationship the elongate projections of the second plate.

2. The improvement of claim 1 wherein the distance between two planes tangent to neighboring projections of the first and second plates becomes larger with respect to the direction of fluid flow with respect to groups of consecutive projections when going from the flow channel inlet end to the flow channel outlet end.

3. The improvement of claim 1 wherein an angle of inclination of the elongate projections with respect to the direction of fluid flow through the channel is between about 10° and about 90°.

4. The improvement of claim 1 wherein an angle formed between the elongate projections and the direction of fluid flow through the channel increases steadily from projection to projection.

5. The improvement of claim 1 wherein an angle formed between the elongate projections and the direction of fluid flow through the channel increases steadily between related groups of consecutive projections to define an overall angle increase of from about 20° to about 90° from the flow channel inlet end to the flow channel outlet end.

6. The improvement of claim 1 wherein a ratio of a cross-sectional area of an elongate projection to a cross-sectional area of an intermediate space between adjacent elongate projections disposed on the same plate in the direction of fluid flow is at least about 0.5:1.

7. The improvement of claim 6 wherein the sum of the cross-sectional areas of the elongate projections added to the sum of the corresponding cross-sectional areas of the intermediate spaces between the adjacent elongate projections disposed on the same plate is at least 4000 mm$^2$/meter length of the first and second plates, said length being measured from the inlet end to the outlet end of the flow channel.

8. The improvement of claim 1 wherein the distance between two planes tangent to neighboring projections of the first and second plates is at least about 5 mm.

9. The improvement of claim 1 wherein the distance between two planes tangent to neighboring projections of the first and second plates becomes larger with respect to the direction of fluid flow from projection to projection when going from flow channel inlet end to the flow channel outlet end.

* * * * *